US011061930B1

(12) United States Patent
Golding

(10) Patent No.: US 11,061,930 B1
(45) Date of Patent: Jul. 13, 2021

(54) DYNAMIC MANAGEMENT OF STORAGE OBJECT PARTITIONING

(71) Applicant: Amazon Technologies, Inc., Seattle, WA (US)

(72) Inventor: Tod Golding, Gold River, CA (US)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 15/885,533

(22) Filed: Jan. 31, 2018

(51) Int. Cl.
*G06F 16/27* (2019.01)
*G06F 3/06* (2006.01)
*G06F 16/28* (2019.01)
*G06F 16/22* (2019.01)
*G06F 16/23* (2019.01)

(52) U.S. Cl.
CPC .......... *G06F 16/278* (2019.01); *G06F 3/0611* (2013.01); *G06F 3/0613* (2013.01); *G06F 3/0644* (2013.01); *G06F 3/0653* (2013.01); *G06F 16/2291* (2019.01); *G06F 16/2358* (2019.01); *G06F 16/289* (2019.01); *G06F 16/2264* (2019.01)

(58) Field of Classification Search
CPC ... G06F 16/278; G06F 16/289; G06F 16/2291
See application file for complete search history.

(56) References Cited

U.S. PATENT DOCUMENTS

| 8,364,677 | B2 | 1/2013 | Brodfuehrer et al. |
| 9,052,831 | B1* | 6/2015 | Stefani .................. G06F 3/0619 |
| 9,317,577 | B2 | 4/2016 | Duan et al. |
| 2004/0199533 | A1* | 10/2004 | Celis ................... G06F 16/2255 |
| 2008/0209451 | A1* | 8/2008 | Michels .................... G06F 9/54 |
| | | | 719/328 |
| 2014/0258252 | A1* | 9/2014 | Schreter ................ G06F 16/284 |
| | | | 707/696 |
| 2017/0301041 | A1* | 10/2017 | Schneider .............. G06Q 50/01 |

* cited by examiner

*Primary Examiner* — Loc Tran
(74) *Attorney, Agent, or Firm* — Robert C. Kowert; Kowert, Hood, Munyon, Rankin & Goetzel, P.C.

(57) ABSTRACT

Systems and methods are provided to implement a partitioned data store that transparently manages the partitioning of storage objects. In embodiments, the data store may determine that a user-specified partition key for a storage object is inadequate to properly partition the storage object, and generate another partition key that includes the user-specified partition key and another partition attribute. The data store may allow clients to query and update the data using the user-specified partition key, but transparently rebalance the actual partitions by adjusting the generated partition key. In embodiments, the data store may monitor usage metrics for its partitions, and take rebalancing actions (e.g., splitting partitions or relocating partition data) to dynamically maintain balance among the partitions. In embodiments, the data store may provide an analytics interface that displays the usage metrics for the different user-specified partitions.

20 Claims, 11 Drawing Sheets

TENANT USAGE PROFILES 600

TENANTS 610:

| TENANT | # PARTS. | STORAGE |
|---|---|---|
| ALICE | 16 | 12 GB |
| BOB | 16 | 8 GB |
| CINDY | 8 | 4 GB |
| DAVID | 4 | 4 GB |

PARTITIONS FOR BOB 620:

| PARTITION | STORAGE | R/W FREQ | LATENCY |
|---|---|---|---|
| 01 | 4.2 GB | 65 | 15 |
| 02 | 2.0 GB | 36 | 12 |
| 03 | 0.5 GB | 36 | 12 |
| 04 | 0.5 GB | 32 | 14 |

PARTITION DATA FOR BOB PART 01 630:

PARTITION STORAGE GROWTH 640

| STORAGE 632 | REQ FREQ 633 | LATENCY 634 | VALUE COUNT 635 | RULES 636 | LOG 637 | MODIFY 638 |
|---|---|---|---|---|---|---|

DYNAMIC MANAGEMENT OF STORAGE OBJECT PARTITIONING

BACKGROUND

Multi-tenant database systems storing large amounts of data for different tenants often receive a high volume of request traffic. In some implementations of these databases, database objects such as tables or indexes may be divided into multiple partitions that are separately managed by different groups of storage or compute nodes. However, current databases generally do not have any real awareness of the partitioning or data distribution goals of the individual tenants that use the database. For example, in a database table that is partitioned by tenants, a single large tenant may saturate the partitioning of a table, resulting in suboptimal database performance for all tenants. This lack of awareness limits the database's ability to apply dynamic strategies to partition the data effectively for each tenant. In addition, in current databases, it is generally difficult to implement tenant-specific partitioning rules. These issues generally reduce the usefulness and efficiency of partitioned databases shared by a large number of tenants.

BRIEF DESCRIPTION OF THE DRAWINGS

FIG. 6 illustrates an example user interface that may be used to view data usage profiles of tenants in a data store that manages tenant data usage across multiple partitions, according to some embodiments.

Figure 1:
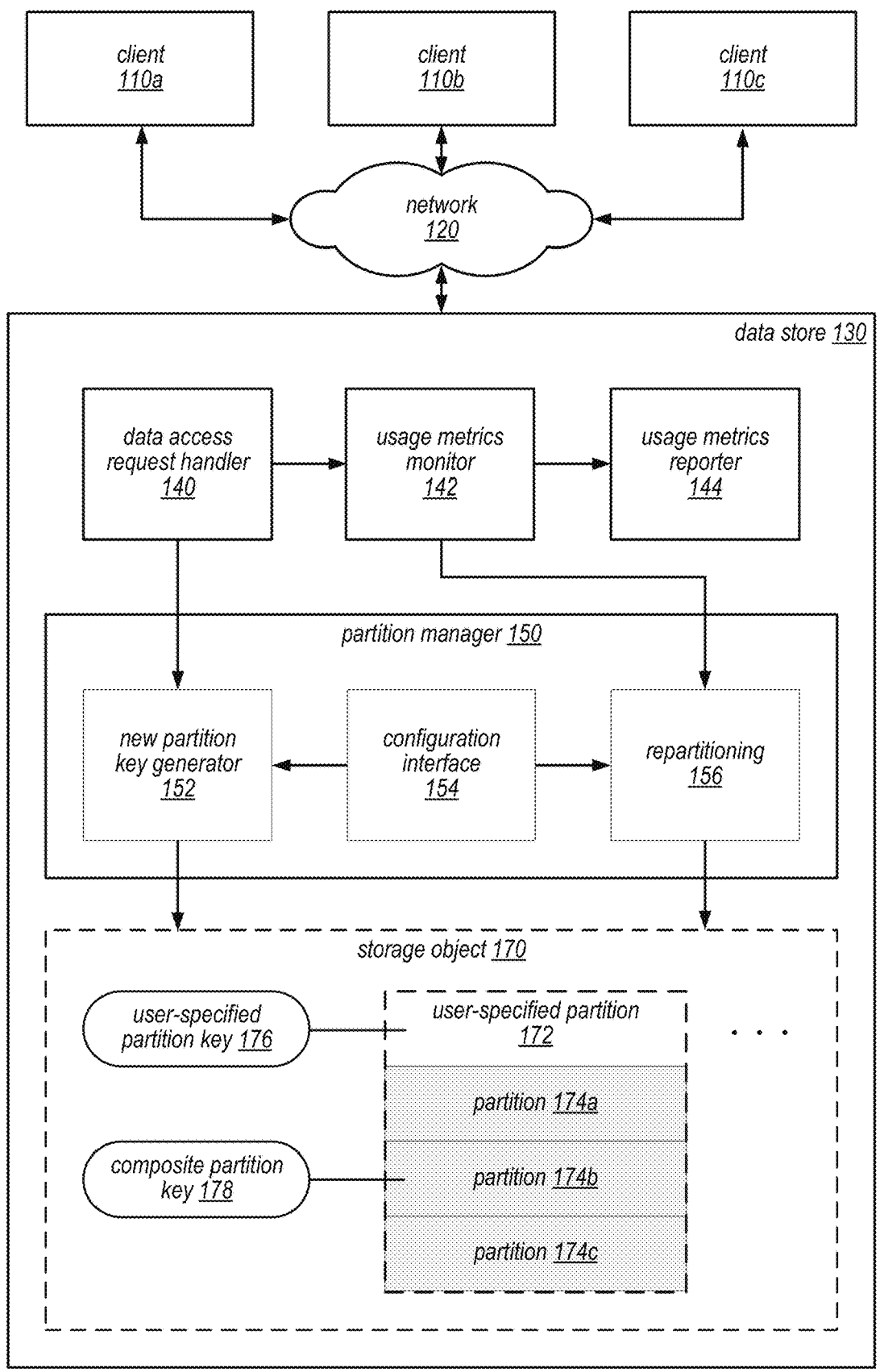
FIG. 1 is a block diagram illustrating an example data store that dynamically manages tenant data usage across multiple partitions of a storage object, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in various embodiments to implement a multi-tenant data store or database service that manages tenant data usage across multiple partitions of a storage object. In some embodiments, a storage object in the data store, such as a table or an index, may be divided into multiple partitions hosted by a different group of compute nodes or stored via a different group of storage nodes. As described herein, the data store is configured to dynamically manage the partitioning of the storage object in a manner that is transparent to the database user. In some embodiments, the data store may override the user-specified partition key of the storage object (e.g., a tenant identifier) and employ an internally generated partition key to repartition the storage object based on observed usage metrics. At the same time, the data store may continue to present to the user an appearance of the storage object as partitioned according to the user-specified partition key (e.g., the tenant identifier), which may be required for application-level correctness.

In some embodiments, the data store may be configured to determine that a user-specified partition key of a storage object does not adequately partition the storage object. For example, in some embodiments, the data store may detect that not enough distinct key values exist for the user-specified partition key. For example, a table partitioned by a tenant identifier may be saturated by a single large tenant. In response, in some embodiments, the data store may generate and employ another partition key to manage the partitioning. In some embodiments, the data store may generate a composite partition key that includes the user-specified partition key and also one or more additional attributes, which may be hidden from the user. Using the composite partition key, data items of each tenant may be further partitioned based on other criteria, to achieve other partitioning, performance, and/or efficiency goals of the tenant. In some embodiments, data items belonging to a particular tenant may be distributed across multiple partitions, so as to improve database performance for the tenant. In some embodiments, the partitioning of tenant data may be governed by one or more criteria, which may be configurable by an administrator or user of the data store.

As one skilled in the art will appreciate in light of this disclosure, certain embodiments may be capable of achieving certain technical advantages over prior art data stores. For example, by spreading the data of individual tenants over multiple partitions, the data store is able to parallelize data accesses and improve the database performance for that tenant. Because this partitioning may be performed despite the user-specified partition key, the disclosed approach allows the storage object to be properly partitioned for database performance, while still enforcing the tenant isolation requirements of the users or applications.

The disclosed data store may have particular utility in certain multi-tenant environments, where the data store must be partitioned based on a tenant identifier, as dictated by higher level applications or other reasons. In some embodiments, the data store allows the data of each tenant to be fairly and intelligently distributed across multiple partitions, so that the data store's performance for each tenant is maintained.

In some embodiments, the management of the partitioning may be performed automatically and completely behind the scenes, so that the partitioning operations are largely invisible to the data store's users. In some embodiments, the data store may dynamically partition the storage object based on how the storage object is used. In some embodiments, the data store may implement a monitoring of the usage metrics of the individual partitions in the storage object. For example, in some embodiments, metrics may be collected for each tenant or each partition in the storage object. When an imbalance condition or other specific condition is detected in the usage metrics, the data store may automatically and dynamically perform one or more rebalancing operations, such as for example moving data from one partition to another, or splitting a large partition into smaller partitions. Such features improve upon current data store systems to, for example, dynamically detect and eliminate hotspots in the partitions.

In some embodiments, the data store may be configured to enforce different types of tenant-specific partitioning rules. For example, in some embodiments, the data store may isolate the data of a particular tenant to a particular set of partitions that are not shared with other tenants. Thus, sensitive data of the particular tenant is not processed or stored using the same computing resources that service another tenant. In some embodiments, these tenant-specific partition rules may be provided via a configuration user interface or API.

In some embodiments, the usage metrics that are collected or monitored by the data store may be compiled and presented via one or more analytics user interfaces. The user interface allows users to visualize the data usage patterns of the different tenants. For example, in some embodiments, the user interface may display a sorted list of user-specified partition key values (e.g., tenant IDs) in terms of different usage metrics. In some embodiments, the user interface may detect one or more undesirable conditions in the usage metrics, and warn the user regarding the condition or possibly suggest a user action (e.g., to purchase more computing resources) to resolve the condition. In this manner, the disclosed data store improves the ability of current data store systems to provide insightful data usage information to users. These and other features and benefits of the inventive data store system and methods are described in further detail below, in connections with the figures.

FIG. 1 is a block diagram illustrating an example data store that dynamically manages tenant data usage across multiple partitions of a storage object, according to some embodiments. As shown, the data store or database system 130 may interact with multiple clients 110*a-c* via the network 120. The data store system 130 may encompass any type of data store or database configurable to receive service requests from the clients via network 120. In some embodiments, the data store 130 may not be a network-based storage service, but rather be accessed by a client on the same computer. In some embodiments, a given client may include a suitable version of a web browser or a plug-in module for a web browser, or other type of code module configured to execute as an extension to or within an execution environment to provide database or data storage service clients (e.g., client applications, users, and/or subscribers) access to the services provided by data store 130. In some embodiments, a client may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. In some embodiments, the client may be an application configured to interact directly with the database system 130. In some embodiments, a client may be configured to generate web service requests according to a Representational State Transfer (REST)-style web services architecture, a document- or message-based web services architecture, or another suitable web services architecture.

As illustrated, the data store 130 may receive requests from and send responses to the clients via a network 120. In various embodiments, the network 120 may encompass any suitable combination of networking hardware and protocols necessary to establish network communications between clients and data store 130. For example, network 120 may encompass the various telecommunications networks and service providers that collectively implement the Internet. Network 120 may also include private networks such as local area networks (LANs) or wide area networks (WANs) as well as public or private wireless networks. For example, both a given client and data store 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and data store 130. In some embodiments, clients may communicate with network-based data store 130 using a private network rather than the public Internet. For example, a client may be provisioned within the same enterprise as the data store 130 and/or the underlying system described herein. In some embodiments, a client may comprise a service that is offered by the same service provider that offers the data store 130 as a service.

In some embodiments, the data store or database 130 may be configured to implement one or more service endpoints configured to receive and process service requests, such as requests to access database objects maintained on behalf of clients/users by data store 130, and/or the items and attributes stored in those database objects. For example, data store 130 may include hardware and/or software configured to implement various service endpoints and to properly receive and process HTTP-based web services requests directed to those endpoints. In one embodiment, data store 130 may be implemented as a server system configured to receive web services requests from clients and to forward them to various components that collectively implement a data storage system for processing. In some embodiments, data store 130 may be configured as a distributed system (e.g., in a cluster topology) implementing load balancing and other request management features configured to dynamically manage large-scale web services request processing loads.

The data store 130 may include different versions of some of the components illustrated in the figure to provide functionality for creating, accessing, and/or managing tables and/or indexes maintained in database instances within a multi-tenant environment. In various embodiments, the components in the data store 130 may be implemented directly within computer hardware, as instructions directly or indirectly executable by computer hardware (e.g., a microprocessor or computer system), or using a combination of these techniques. For example, the components of the data store 130 may be implemented by a distributed system including a number of computing nodes (or simply, nodes), such as computing systems described below. In some embodiments, the functionality of a given storage service system component may be implemented by a particular computing node or may be distributed across several computing nodes. In some embodiments, a given computing node may implement the functionality of more than one storage service system component.

In various embodiments, data store 130 may be configured to support different types of service requests. For example, in some embodiments, data store 130 may be configured to implement a particular web services application programming interface (API) that supports a variety of operations on tables or indexes, or other data objects, that are maintained and managed on behalf of clients/users by the data storage service system. The APIs provided by the data store 130 may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

In some embodiments, objects in the data store 130, such as storage object 170, may be divided into partitions (e.g., partitions 174a-c and 178a-b). In some embodiments, the database or data store 130 may be partitioned globally, and not just within individual storage objects. In some embodiments, each partition 170 may be independently managed by a group of compute or storage nodes, which may maintain replicas of the data in the partitions. A partition replica may be assigned to a particular storage node based largely (or solely) on whether there is enough storage capacity for the anticipated size of the storage object. For example, the anticipated size may be based on information included in a request to create the table or index, on usage history for the client on whose behalf the table or index was created, or on a history of accesses that target the table or index, the partition, or the replica itself (e.g., if this is a partition replica that is being reassigned as part of a move operation). In such embodiments, there may or may not be enough throughput capacity for the partition replica on the selected storage node (or storage device thereof). For example, a storage device to which the partition replica is assigned may be oversubscribed in terms of input/output operations per second ("IOPS"), the actual number of IOPS may be more than was expected, or the provisioned (or committed) number of IOPS may have grown after the partition replica was created.

In some embodiments, the database 130 may support seamless scaling of storage objects 170 in a "fully shared nothing" type architecture. For example, in some embodiments, each table or index partition (e.g., partitions 174 and 178) may be implemented as a completely independent parallel computation unit. In such embodiments, the system may provide minimal distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, dynamic repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

As shown, the data store 130 may implement a multi-partition storage object 170 that includes partitions 174a-c and 178a-b. In some embodiments, each partition may be implemented using a group of storage nodes, and be configured to store data items in a sorted order according to one or more sort keys of the storage object. In some embodiments, the storage nodes may be implemented using a pool of compute instances, which may be virtual machine instances hosted on different virtualization hosts, and provisioned as needed. The modules of the storage nodes may be configured to perform a storage functions such as the handling of storage requests, partition management, and/or replication and failover processes. In some embodiments, a storage node instance may include a storage engine, which may be configured to maintain (i.e. to store and manage) one or more tables or indexes in storage via storage API.

In some embodiments, the storage object 170 may initially be partitioned into user-specified partitions, such as user-specified partition 172. The user-specified partition may be defined according to a user-specified partition key 176. For example, in some embodiments, the user-specified partition key 176 may be a tenant identifier, which means that the data records of different tenants may be stored on different partitions by the data store. In some embodiments, different tenants may be distinct data owners that are associated with different each data items in the storage object. For example, different tenants may correspond to different users, companies, departments, etc. that are associated with a group of data items in the storage object. In some embodiments, the user-specified partition key 176 may be different entity identifiers, such as, for example, a company ID, a department ID, and the like. In some embodiments, the use of such identifier as the user-specified partition key may be required by the database application. For example, the database application may require some degree of isolation between the entities, or always assume a particular entity in its data access requests.

However, in some embodiments, the data store (e.g., via the partition manager 150) may determine that the user-specified partition key 176 is not an appropriate partition key. For example, in some cases, the user-specified partition key where a single tenant has a large amount of data, that data will not be adequately partitioned to take full advantage of the partitions of the table. A similar problem arises if there are simply not enough distinct key values to take full advantage of the available partitions. In addition, a number of large tenants may cause the data of smaller tenants to be pushed onto a single (or a few) partition, thus reducing database performance for those tenants. In general, the effectiveness of the user-specified partition key 176 as a partition key is dependent on factors such as the actual content of the data and also later data access patterns. Thus, the user-specified partition key 176, which is chosen at the creation time of the table and in some cases dictated by application requirements, may not be a good partition key for the storage object 170.

Thus, in some embodiments, the data store may detect that the user-specified partition key 176 is not a good partition key, and in response, generate an internal partition key (e.g., the composite partition key 178) to be used to partition the data items. In some embodiments, the storage object may be explicitly configured to not use the user-specified partition key as the actual partition key for the storage object. For example, a table's creator may know a priori that the specified partition key will not have enough distinct values to adequately partition the table. Thus, the creator may configure the table's partitions to be dynamically managed by the data store, using an internally generated partition key.

In some embodiments, the data store 130 employ a partitioning criterion to evaluate the adequacy of a user-specified partition key. In some embodiments, the criterion may specify a minimum number of distinct values for the partition key. In some embodiments, the criterion may specify a minimum value for record count per partition key value. In some embodiments, the criterion may specify a performance goal (e.g., maximum level of storage utilization per partition, maximum number of latency, etc.). In some embodiments, the partitioning criterion may specify a cost to the user. For example, in some embodiments, the partition manager may be aware of the cost model of the storage object, and the evaluation may entail comparing a predicted cost to the user given the current partition key to a maximum allowable cost. The data store may periodically compare the partitions' actual performance metrics with these goals or criteria, to determine if the current partition key is adequate. When a user-specified partition key is found to be inadequate based on the partitioning criterion, the data store 130 may take measures to generate a new partition key (e.g., composite partition key 178) for the data items, for example using the new partition key generator 152, as shown. In some embodiments, the new partition key will be a managed partition key that can be dynamically modified or reassigned by the data store in order to dynamically repartition the store object.

In some embodiments, the new partition key generator 152 may generate the managed composite partition key 178 that includes, or is based on, both the user-specified partition key and one or more other attributes. The effect of this composite partition key 178 is to further divide user-specified partition 172 into smaller partitions 174a-c. These smaller partitions 174 may be transparently managed by the data store to keep the partitions in relative balance, thus improving access performance for each user-specified partition (e.g., for each tenant). Moreover, because the user-specified partition key 176 is still part of the composite partition key, the boundaries between the user-specified partitions are preserved, and the data store 130 may be able to reconstruct the user-specified partition 172 when needed, and present a logical view of the user-specified partition 172 during data access.

As shown, in some embodiments, the partitioning of the storage object 170 may be managed via a partition manager 150. In some embodiments, the operations of the partition manager 150 are fully autonomous, and its operations may be generally hidden from the data store user. Thus, in some embodiments, the partition manager 150 may implement a completely managed solution for storage object partitioning, which does not require any input or knowledge on the part of the user. Depending on the embodiment, the partition manager 150 may be implemented hardware, software, or a combination thereof. In some embodiments, the partition manager may be implemented as a plurality of software modules, or as part of different existing software modules of the database or data store 130. In some embodiments, the partition manager 150 may be implemented as a distributed component on a group of compute nodes. Depending on the embodiment, the partition manager may be implemented as part of the control plane of the data store, the data plane, or both.

As shown, in some embodiments, the partition manager 150 may interface with clients via a data access request handler 140. The data access request handler 140 may implement the normal functions of inserting, updating, deleting, and/or querying data in the data store 130. In some embodiments, the partition manager 150 (or a portion thereof) may be implemented within the data access request handler 140. In some embodiments, when a new data item is inserted or added to the storage object 170, the data access request handler 140 may communicate with the new partition key generator 152 to assign the new data item to a partition based on the internally generated composite partition key.

As discussed, in some embodiments, the composite partition key 178 may include the user-specified partition key 176 and one or more other attributes. In some embodiments, the additional attributes may be hidden from data store clients. In some embodiments, new partition key generator 152 may generate the one or more additional attributes of the composite key in a pseudorandom or round robin fashion, so that new data items are distributed to the different partitions in roughly equal proportions. In some embodiments, the additional attributes may be generated via a hash function, which hashes a set of existing attributes of the data item to obtain a partition identifier. In some embodiments, the hashed attributes may include a timestamp associated with the creation time of the data item. In some embodiments, the hashed attributes may be specified as part of the configuration metadata for the storage object 170, which specify how the partitioning should occur. For example, in some embodiments, the user may specify that all data items having a common location attribute should be placed (as much as possible) in the same partition(s). This way, common queries directed to data items in a single location can be performed using a single partition, for example.

In some embodiments, the partition manager 150 may maintain metadata regarding the partitions and the user-specified partitions (e.g., partitions of individual tenants). For example, in some embodiments, the partition manager 150 may maintain a partition map, which maps the partitions 174 of the storage object 170 to each user-specified partition 172. In some embodiments, the partition manager 150 may also maintain metrics such as the space utilization and activity level associated with each partition or user-specified partition. The metrics data may be capture by periodically polling the different partitions. In some embodiments, the data may be captured via a usage metrics monitor 142, as shown.

Depending on the embodiment, the usage metrics monitor 142 may be implemented via software, hardware, or a combination of both. In some embodiments, the usage metrics monitor 142 may be implemented as part of a normal metrics collection subsystem of the data store 130. For example, in some embodiments, the data store may generate events or log data for each access to the data store, and the usage metrics monitor 142 may register as a listener to such events, or continually observe the access log. In some embodiments, the usage metrics monitor 142 may be programmed to update a set of usage metrics that is used by the partition manager 150 to perform its functions. In some embodiments, a different set of usage metrics may be maintained for each storage object 170 whose partitioning is to be managed by the partition manager 150.

In some embodiments, after the initial assignment of data items to the partitions, the partition manager 150 may perform housekeeping or background operations to keep the partition relatively balanced in terms of usage. Thus, for example, if a particular partition becomes too large or hot, the partition manager 150 may split that partition into two or more smaller partitions. In some embodiments, the partition manager 150 may also store or access statistics relating to the different user-specified partitions, such as the storage and activity level of each user-specified partition. Thus, for example, if a partition is handling too much data or experiencing too much request traffic, the partition manager 150 may move some number data for that partition to another partition. In some embodiments, these operations (e.g., the splitting of partitions or movement of partition data) may be implemented via a repartitioning component or module 156, as shown.

In some embodiments, the repartitioner 156 may continuously monitor or observe the relevant metrics, and compare the metrics against rules specified in for example a partition policy. When the relevant metrics indicate an imbalance condition (e.g., when one partition becomes much larger than other partition in the same user-specified partition, or when one partition becomes much hotter than other partitions of the same storage object), the repartitioner may take action to bring the partitioning back into balance, according to the partition policy. In some embodiments, the repartitioner 156 may be launched periodically by the partition manager. In some embodiments, the repartitioner may operate as a background process on one or more compute nodes. In some embodiments, the repartitioner may only take action on a partition when that partition is not under heavy usage. Thus, any rebalancing activities will not cause perceptible performance degradations to normal data access functions.

As shown, in some embodiments, the data store 130 may implement a configuration interface 154 for the partition manager 150. Depending on the embodiment, the configuration interface 154 may be a graphical user interface (GUI), a web interface, an application programming interface (API) such as a web services interface, or a combination thereof. In some embodiments, the configuration interface 154 may be exposed as part of a set of administrator interfaces to the data store 130. In some embodiments, the configuration interface 154 may be provided to individual clients, which may allow the client to configure their own partitioning requirements, policies, etc. For example, in some embodiments, each tenant may specify different parameters on how its user-specified partition should be maintained and managed. In some embodiments, the configuration interface 154 may also expose controls that allow users to manually perform repartitioning operations such as splitting partition or moving data.

In some embodiments, the configuration interface 154 may allow users to configure whether and how the composite partition key 178 should be generated (e.g., by specifying a set of criteria that influences the makeup of the composite partition key). For example, in some embodiments, it may be known a priori that the user-specified partition key 176 is not a good choice for the actual partitioning key of the storage object. Thus, the configuration interface 154 may be used to specify that a composite partition key 178 should be used for that storage object. In some embodiments, the configuration interface 154 may be used to specify the partitioning criteria that determines whether the composite partition key 178 should be generated (e.g., if a particular user-specified partition key grow too large). In some embodiments, the configuration interface 154 may be used to specify how the composite partition key 178 should be generated, for example, in a pseudorandom or round robin manner, or via a hash of one or more selected attributes of the data items, which may have a desired distribution profile over the data.

In some embodiments, the configuration interface 154 may also be used to configure the behavior of the repartitioner 156. For example, in some embodiments, the configuration interface may be used to specify the minimum and maximum number of partitions that can be created for each user-specified partition. In some embodiments, the configuration interface may be used to specify the types of repartitioning operations that are allowed (e.g., splitting or merging of managed partitions), and under what conditions the repartitioning operations should be performed (e.g., when a partition's storage level or request volume exceeds a certain threshold).

In some embodiments, the configuration interface may also be used to specify tenant-specific rules. For example, the repartitioner 156 may be configured to isolate the data of one tenant from other tenants, by only storing data of that one tenant on partitions that do not store data of other tenants. Such isolation rules may be useful in some embodiments as a security measure, to ensure that compute nodes that store or handle the sensitive data of one tenant are not shared with other tenant.

In some embodiments, the configuration interface or some other interfaces of the data store may be used to set permission settings for the tenants. For example, in some embodiments, each tenant identifier may be associated with a set of permission settings, so that, for example, only certain tenants may read or update the data of a particular tenant. In operation, if a read or write request from a particular tenant X specifies data for a tenant identifier Y that tenant X is not authorized to read or write, the data store may deny the read or write request, based on the permission setting. In some embodiments, this enforcement of permissions may be delegated to the individual partitions, which may enforce permission rules for the different tenants that they manage.

As shown, in some embodiments, the data store 130 may implement a usage metrics reporter 144. Depending on the embodiment, the usage metrics reporter 144 may be a GUI, a web interface, an API such as a web services interface, or a combination thereof. In some embodiments, the usage metrics reporter may generate analytics that are compiled from the metrics data gathered by the partition manager 150, which are then presented via user interfaces. In some embodiments, the usage metrics reporter 144 may provide data for all user-specified partitions (e.g., tenants), to an administrator of the data store 130. In some embodiments, the usage metrics reporter 144 may rank the partitions or user-specified partitions according to one or more metrics or analytics parameters. In some embodiments, the usage metrics reporter 144 may perform some degree of regression analysis of the metrics over time, so as to detect time-based trends in the data. In some embodiments, the usage metrics reporter 144 may make predictions based on patterns observed in the usage metrics, and make suggestions or recommendations to the user regarding partition management. For example, in some embodiments, the usage metrics reporter 144 may report that based on current data growth rates, a particular tenant will experience unacceptably long latencies in three months, and make a recommendation to double the number of partitions for that tenant.

Figure 2:
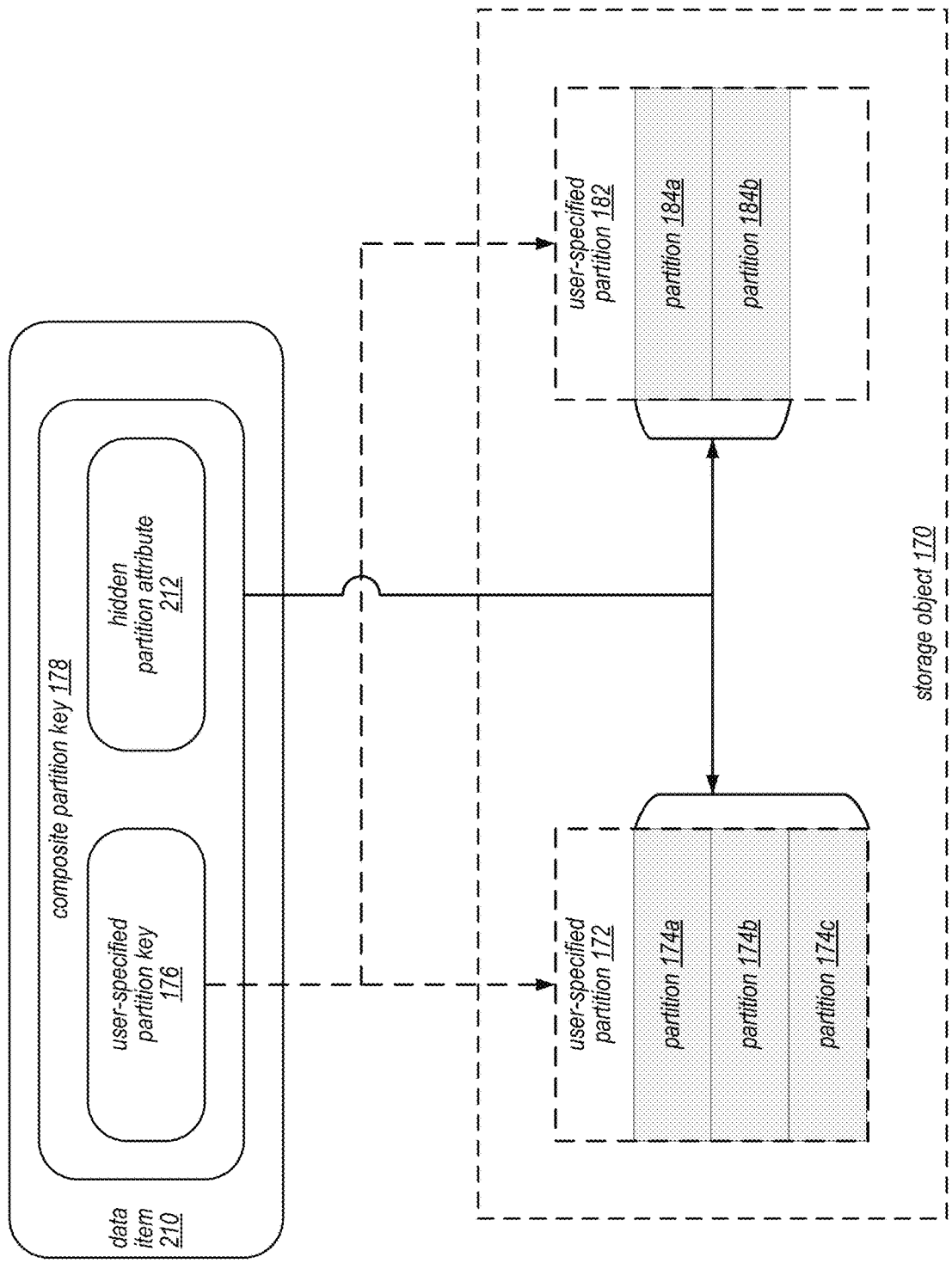
FIG. 2 is a diagram illustrating the use of a composite partition key to manage tenant data usage across multiple partitions of a storage object, according to some embodiments.

FIG. 2 is a diagram illustrating the use of a composite partition key to manage tenant data usage across multiple partitions of a storage object, according to some embodiments. As shown, how the various attributes in a data item 210 are used to assign the data item to the partitions discussed in connection with FIG. 1.

As shown, a data item 210 to be stored in the storage object 170 may initially include a user-specified partition key 176. As discussed, this key 176 may be used to assign the data item 210 to one or more user-specified partitions, such as partitions 172 and 178. For example, in some embodiments, the user-specified partition key 176 may indicate a tenant ID for each data item, and the key 176 may be used to select a user-specified partition for each data item (e.g., partitions 172 or 182), as shown.

As discussed, in some embodiments, the data store may determine that the user-specified partition key 176 is inadequate to partition the data items based on one or more partition criteria. In response, the data store may generate a composite partition key 178. As shown, in some embodiments, the composite partition key 178 may be included as part of the data item 210. In some embodiments, the composite partition key 178 may include the user-specified partition key 176 and another hidden partition attribute 212. The composite partition key 178 thus further divides the user-specified partitions into smaller partitions (e.g., partitions 174 and 184). In some embodiments, the partition manager may use the composite partition key 178 to select the partition for each data item. In some embodiments, the partition manager may modify or reassign data items according using the managed composition partition key. In this manner, the partition manager may be able to dynamically repartition the storage object based on observed usage metrics of the storage object.

Depending on the embodiment, the hidden partition attribute 212 may be generated in a variety of ways. In some embodiments, the hidden partition attribute 212 may be just a pseudorandom value, or a value generated in round robin fashion (e.g., 1, 2, 3, 4, etc.). In this manner, the data items may be distributed to each of the partitions in roughly equal proportions. In some embodiments, weight factors may be used to generate the hidden partition attribute 212, so that data items are assigned the hidden attribute values in unequal proportions. This weighting may be useful in situations where it is desirable to assign more data items to one partition versus another, for example, when one partition is already under heavy usage. In some embodiments, as shown, the hidden partition attribute 212 may be generated via a hash function, which may take as input some set of other attributes of the data item 210.

In some embodiments, the hidden partition attribute 212 may be stored with the data item 210. In some embodiments, the hidden partition attribute 212 may only be used to generate a partition ID, and so the hidden partition attribute 212 is not stored with the data item. In some embodiments, the hidden partition attribute 212 may not be readily visible to the clients of the data store. Thus, the clients may be completely shielded from the partition management activities of the data store. In some embodiments, rather than having a hidden partition attribute 212, the additional attribute or the actual partition ID of the data item (e.g., the composite partition key) may be made available to clients. For example, in some embodiments, when a new data item is inserted into the data store, the data store may return an acknowledgment indicating the actual partition ID of the data item. Thus, a subsequent access to that data item may be directed to the actual partition storing the data item, until the data item is moved via a repartitioning operation.

Figure 3:
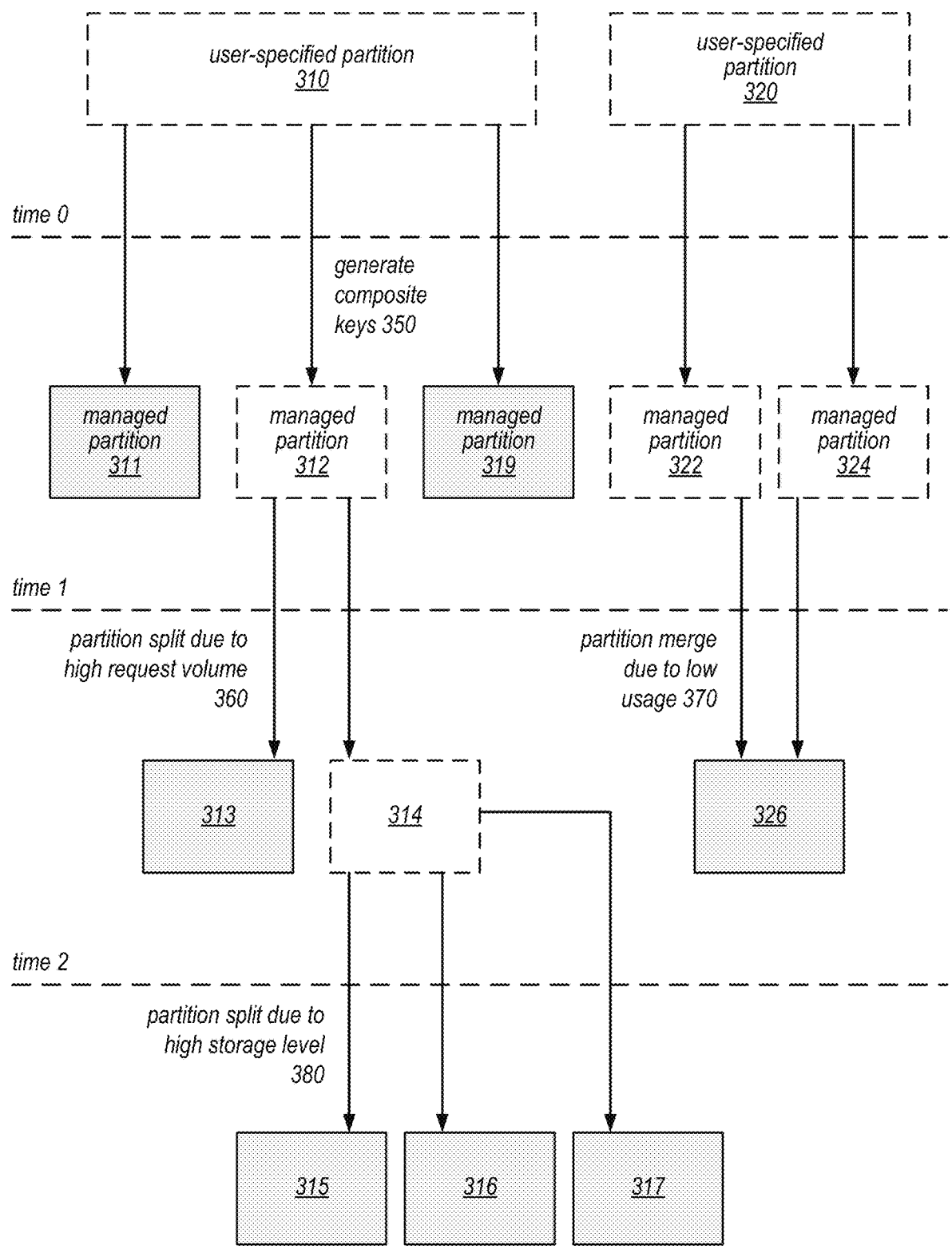
FIG. 3 illustrates example techniques employed by a data store to manage tenant data usage across multiple partitions, according to some embodiments.

FIG. 3 illustrates example techniques employed by a data store to manage tenant data usage across multiple partitions, according to some embodiments. As shown, the figure depicts how partitions of a storage object (e.g., storage object 170 of FIG. 1) may changes over time, due to the partition management operation of the data store. In the figure, partitions shown in dashed lines have no longer exist as of the current time, while the colored partitions are current partitions.

As shown, the storage object may initially contain only user-specified partitions 310 and 320. As discussed, these user-specified partitions are divided based on distinct values of a user-provided partition key, such as a tenant ID. In some embodiments, it may be determined that the user-specified partitions are not adequately partitioning the data in the storage object, and so, the data store may repartition the storage object by generating a new partition key.

As shown, at time 0, a composite partition key is generated 350. As discussed, in some embodiments, the composite partition key may subdivide the user-specified partition keys into multiple managed partitions, such as managed partitions 311, 312, 319, 322, and 324, as shown. In some embodiments, the data-store-managed composite partition key may include the user-specified partition key and another attribute. The other attribute may be an existing attribute of the data item, a hash of multiple attributes of the data item, or generated via other types of functions. In some embodiments, the additional attribute may be hidden from clients of the database. In some embodiments, the data store may dynamically repartition the storage object based on the managed composite partition key.

As shown, at time 1, managed partition 312 is split 360 into two additional managed partitions 313 and 314. In some embodiments, as in this case, the split operation may be performed when one or more usage metrics of the partition exceeds a certain threshold, for example, when the request volume of the partition 312 exceeds a threshold. In some embodiments, the partition 312 and its associated computing resources may be maintained, while some of its data is transferred to a newly provisioned partition. In some embodiments, the split operation may provision new compute instances, such as virtual machine instances, to form the new partition. In some embodiments, the split operation of the movement of data may be performed by modifying the hidden attribute or partition ID of a subset of data items in the original partition 312, so that data items in the original partition are assigned to different resulting partitions. In some embodiments, this sort of repartitioning operation may occur only when the managed partition 312 is not under heavy load (or idle), so that clients of the data store are not heavily impacted by the repartitioning operation.

As shown at time 1, two managed partitions 322 and 324 are merged 370. In some embodiments, under certain conditions (e.g., when usage of multiple partitions fall below a threshold), multiple partitions may be merged to form a consolidated partition (e.g., partition 326). In some embodiments, this type of merge operation may be used to consolidate and save the use of computing resources by the data store. In some embodiments, only those partitions having the same user-specified partition key are merged. In this manner, the separation of different user-specified partition keys may be maintained.

As shown, at time 2, another split 380 is performed by the data store. This time, managed partition 314 is split into three partitions 315, 316, and 317, due to the high storage utilization level in partition 314. Thus, in order to keep the usage of the partitions balanced, the partition manager may create three smaller partitions from partition 314. As may be understood, this management process may be ongoing continually, to split and merge portions of the data dynamically, based on observed usage metrics of the storage object. Hotter portions of the data may be partitioned more, while colder portions of the data may be consolidated. As the amount of the data in the storage object grows, more and more partitions may be generated to scale and distribute the data accesses across different computing resources.

At the same time, because the repartitioning operations employs the original user-specified partition key, the data store is able to easily reconstruct the original user-specified partitions to service tenant-specific data access requests. For example, in some embodiments, when servicing a query specifying a particular user-specified partition key, the data store may query a subset of actual partitions that originated from the original user-specified partition. Thus, the data store may appear to the querying client to be still maintaining the user-specified partitions. In some embodiments, a lookup table or partition map may be maintained to map existing partitions to the original user-specified partitions, in order to speed up this translation process. In some embodiments, usage metrics or analytics may be collected for the actual partitions, but then aggregated and presented for the user-specified partitions. For example, in some embodiments, the data store may present usage metrics for each tenant identifier, even though these metrics are actually collected from multiple actual partitions.

Figure 4:
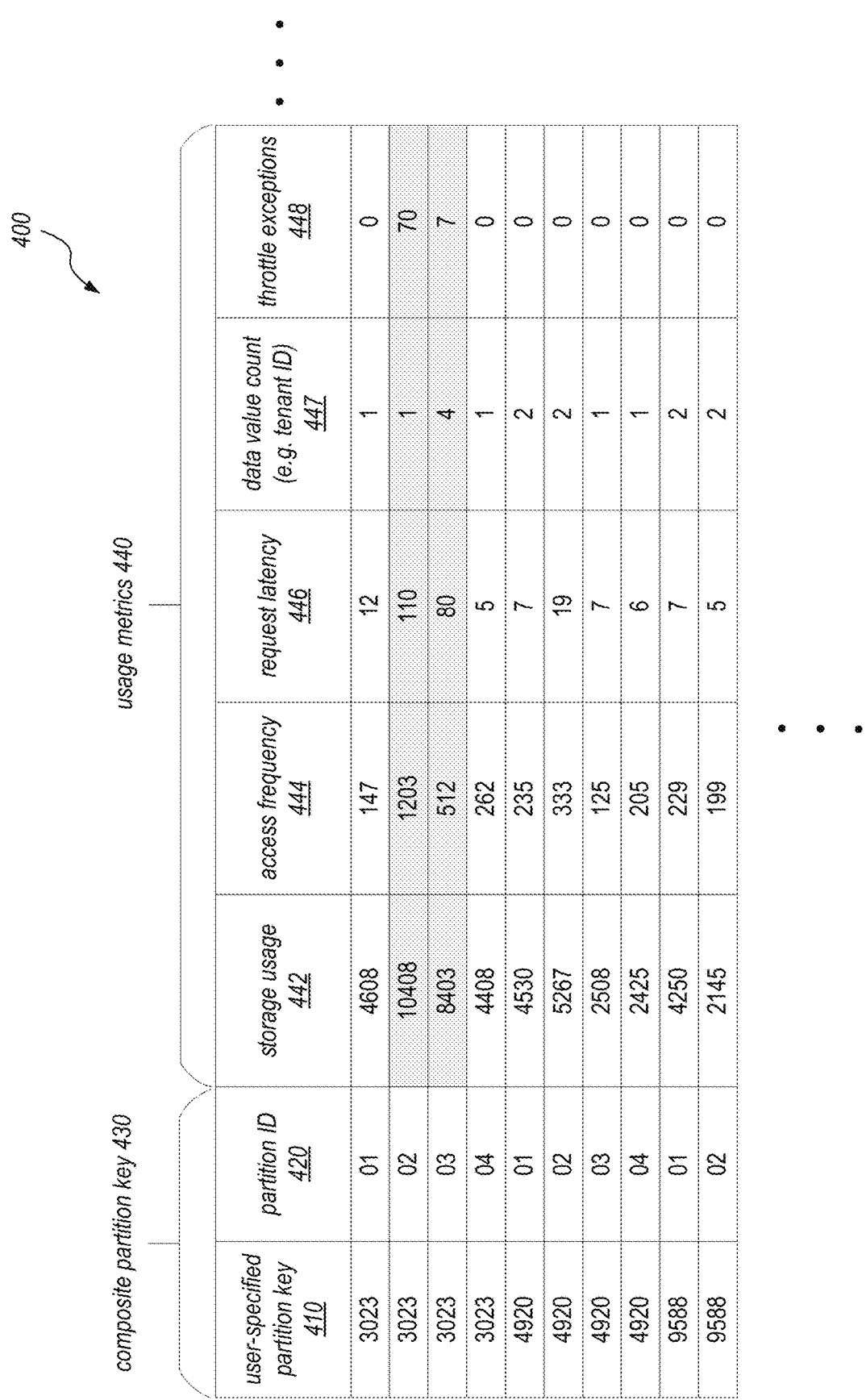
FIG. 4 illustrates example usage metrics that may be collected by a data store to manage tenant data usage across multiple partitions, according to some embodiments.

FIG. 4 illustrates example usage metrics that may be collected by a data store to manage tenant data usage across multiple partitions, according to some embodiments. As discussed, in some embodiments, the data store (e.g., the partition manager 150) may monitor and collect usage metrics that are used to make partition and repartitioning decisions. In some embodiments, these metrics may be collected periodically. In some embodiments, the metrics may be updated in real time, as each access request is processed by the data store.

As shown, in the example table 400, a portion of data for a set of partitions is stored. In the table 400, each record corresponds to a current partition. Field 410 indicates the original user-specified partition key for the partition. For example, different tenants (e.g., persons, companies, departments, or other types of data owner entities) that may wish to isolate their data in a separate partition in the data store. Each tenant may be assigned a unique tenant ID, which may be used as the user-specified partition key. Field 420 indicates a partition ID that is unique to each user-specified partition key. Thus, for example, tenant 3023 in the table is shown to have four different partitions 01, 02, 03, and 04, which allows its data to be distributed over four different partitions. Together, fields 410 and 420 forms the composite partition key 430 in this example. The composite partition key 430 may thus be unique across the entire storage object or the entire data store. Collectively, the four partitions of tenant 3023 form the original user-specified partition for tenant 3023. In some embodiments, the table 400 may be used as a lookup table or partition map, which maps the actual partitions of the storage object to their original user-specified partitions. In some embodiments, as partitions are created, destroyed, split, or merged, this lookup information is updated to reflect the current state of partitioning in the data store.

As shown, each record in the table 400 may include a number of usage metrics 440 that are captured for that partition. For example, the usage metrics may include information such as a current storage usage 442 of the partition, an access or operation frequency 444 of the partition, a data value count 447 of the partition, a request latency 446 of the partition, and a count of throttle exceptions 448 of the partition. In some embodiments, the access or operation frequency may indicate a hotness of a particular partition. For example, a "hot" partition may receive very high frequency of read or write requests over a short period of time (e.g., a minute), or perform a very high frequency read or write operations over a period of time. These hot periods may indicate that the partition should be split. In some embodiments, the access frequency may be captured by a metrics such as the input/output operations per second (IOPS). In some embodiments, the data store may track the peak IOPS for each partition in the past 24 hours, as an indicator of the hotness of the partition. In some embodiments, the data value count 447 may also be a useful metric in partition management. For example, in some embodiments, the number or frequency of distinct values of the user-specified partition key (e.g., a tenant ID) may be monitored by the metrics monitor. A partition that has a high number of distinct tenant IDs may be a candidate for repartitioning. In some embodiments, other the data value count of other attributes may be used to inform the repartitioning decision. In some embodiments, the partition may generate throttle exceptions when a partition receives a large volume of traffic that it is not able to handle. When such an exception is raised, the exception count may be incremented for that partition in the table 400. Depending on the embodiment, many different types of usage metrics 440 may be used. For example, in some embodiments, the usage metrics monitor may collect metrics about CPU utilization, memory utilization, counts of different categories of requests (e.g., read versus write), amount of actual network traffic, among other things. In some embodiments, a history of the metrics may be maintained, so as to allow the partition manager to perform regression or trend analysis on the metrics.

As discussed, the metrics data in the table 400 may be monitored to determine various imbalance conditions specified in the partitioning policy. In response, the partition manager may perform one or more operations to correct the condition and/or communicate the condition to other system components. For example, as shown, partitions 02 and 03 of the tenant 3023 currently has relatively high levels of storage usage, access frequency, and request latency. Moreover, the two partitions both have received a number of throttle exceptions. In some embodiments, the combination of these indicators may trigger a repartitioning operation.

For example, depending on the partitioning policy of the data store, the repartitioner may split partition 02 into two partitions, and move some data in partition 03 to another partition that is less active.

Figure 5:
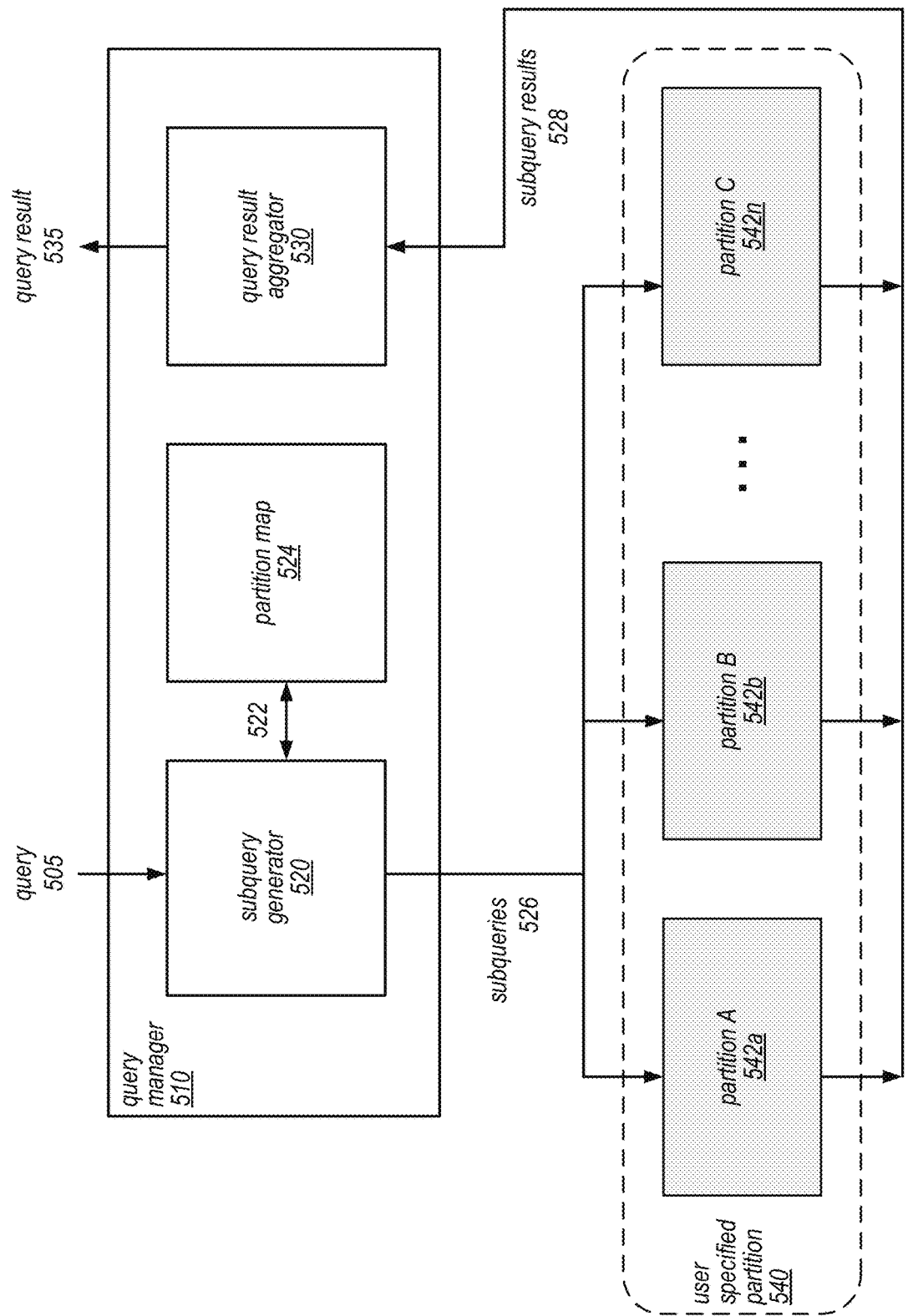
FIG. 5 is a block diagram illustrating components of a query manager in a data store that manages tenant data usage across multiple partitions, according to some embodiments.

FIG. 5 is a block diagram illustrating components of a query manager in a data store that manages tenant data usage across multiple partitions, according to some embodiments. The illustrated query manager 510 may be implemented as part of the data store, for example data store 130 as discussed in connection with FIG. 1. The modules illustrated in the figure are merely exemplary. In some embodiments, some of the modules shown may be implemented together in a single module, in a plurality of separate modules, or in a different location in the data store.

As shown, in some embodiments, the query manager 510 may implement a subquery generator 520 and/or a query result aggregator 530. The subquery generator 520 and query result aggregator 530 may be used in combination to process a query 505 that is directed to the partitions 542*a-c*. In some embodiments, the query may specify the tenant identifier or a user-specified partition key value that is associated with the user-specified partition 540. In some embodiments, the tenant identifier may be determined from the context of the query, for example, a login session associated with the query 505. In some embodiments, the query 505 may explicitly specify the tenant identifier. The query 505 may specify other filter conditions for data items, which may be based on a sort key of the storage object, for example in a range filter. Queries that filter on the sort key may be processed more quickly, as the items may be stored in sorted order in the partitions 542 with respect to the sort key.

In some embodiments, in response to a query, the subquery generator 520 may generate subqueries to the partitions 542*a-c*. In some embodiments, the subquery generator may send the partition subqueries 526 to each of the partitions 542. The subquery generator 520 may determine which partitions to send subqueries to from a partition map 524, as shown. In some embodiments, the partition map 524 may record the current state of the partitions in the data store, and may provide a lookup table that provides all partitions that are associated with a particular tenant (e.g., split from the original user-specified partition for that tenant). By issuing subqueries to all such partitions, the query manage is able to obtain all data items that satisfy the query 505 for the particular tenant. In some embodiments, each partition 542 is configured to handle the subqueries independently. Depending on the embodiment, the subquery generator 520 may send out the subqueries 526 in parallel or in staggered batches.

After the subqueries are issued, the subquery generator 520 may receive the subquery results 528 from the different partitions 542, and provide the results to the query results aggregator 530 for aggregation work. In some embodiments, the query manager 510 may recognize that for some types of queries, no additional aggregation work is required. In that case, the query result aggregator 530 may simply return the results from each of the queries immediately as they are received.

In some embodiments, the query result aggregator 530 may perform functions to aggregate the subquery results received 528 from each partition 542 before the results are returned. For example, in some embodiments, the query 505 may specify a sort order. Accordingly, the query result aggregator 530 may take the results from each of the partitions 542, and place the results in a global sort order. In some embodiments, items in the partitions 542 may be stored by their partitions in a sort order based on a specified sort key. This sorting may enable optimized results fetching for queries that specify a sort key condition. When this is true, the subquery results 528 from each partition may be returned to the query result aggregator 530 already in sorted order. The query result aggregator 530 may then perform a merge sort to return all of the query results 535 in a globally sorted order.

In some embodiments, the query result aggregator 530 may perform additional tasks, such as additional filtering of the results. For example, in the case that a query searches for the three latest pizza orders according to the order time attribute, the partitions may each return the latest three orders in each of the partitions 542. The query results aggregator 530 may then take the partitions' respective top three results, and obtain the global top three results from all of the subquery results. In some embodiments, the query results aggregator 530 may support more complex aggregation functions, such as "sum" functions or "group by" functions. For example, to aggregate query results, the query result aggregator 530 may be programmed with logic to support these aggregation functions across all partitions 542. For example, to implement a "sum" function, the query result aggregator 530 may determine a global sum of all sub-sums provided from the partitions 542.

In some embodiments, the functionality of the subquery generator 520 and query result aggregator 530 may also be used in other operations, for example update or delete item operations from the client. For example, in response to an update or delete operation, the subquery generator 322 or another module may be configured to propagate the update or delete to each of the partitions 542 in parallel. The query result aggregator 530 may be configured to receive acknowledgements of the update or delete to the partitions 542. When all partitions have appropriately acknowledged the operations, the query result aggregator 530 may return a global acknowledgement back to the client, which may include for example an aggregated item count affected by the update or delete operation. By processing updates or deletes to all partitions in parallel, such requests may be performed much more quickly.

FIG. 6 illustrates an example user interface that may be used to view data usage profiles of tenants across multiple partitions, according to some embodiments. The illustrated user interface may be implemented as part of the usage metrics reporter 144, as discussed in connection with FIG. 1.

As shown, the tenant usage profiles interface 600 may be a GUI, which displays a number of views of data associated with tenant partitions. In some embodiments, the GUI may also include control elements that allow users to modify the partition state of the data store, for example, by splitting or merging for particular tenants. In the illustrated example, the GUI includes a tenants view 610, which lists the tenants in the data store, along with certain partition metadata for each tenant, for example the number of partition for each tenant and the maximum storage available to each tenant. In some embodiments, the GUI 600 may display different partition data for each storage object in the data store. In some embodiments, not all tenants may necessarily implement managed partitioning, and so in some embodiments, the tenants view 610 may not include all tenants.

As shown, the GUI 600 may include a partitions view 620. In this example, since the tenant BOB is selected in the tenants view 610, the partition information for BOB is shown in the partitions view 620. In some embodiments, each partition for the selected tenant may be displayed along with certain metadata for each partition, such as the storage used by each partition, the read/write frequency observed for each partition, and the latency observed for each partition. In different embodiments, different types of usage metrics may be displayed in such a view. In some embodiments, the metrics displayed in the view may be configurable.

As shown, the GUI 600 may include a partition data view 630. In this example, since partition 01 is selected in the partitions view 620, partition metadata for the partition 01 is displayed in the partition data view 630. As shown, the partition data view 630 includes a number of tabs, which may display different types of metadata for the selected partition. As shown, the storage tab 632 displays a graph 640. In the graph 640, the partition storage growth of partition 01 is displayed over time. For example, the partition manager may store storage level metrics data over a period of time (e.g., several weeks or months), and display such data in a time graph, as shown. As may be seen, the storage used by the partition in this example is experiencing high growth in recent times. In this case, the storage usage is in danger of exceeding the storage limit of the partition, which is indicated by the dashed line. Thus, this sort of analytics data allows a user or administrator to visualize different types of partition metadata, and make informed decisions about the management of tenant partitions in the data store. In some embodiments, when certain conditions are detected (e.g., storage utilization growth), the profiling system may issue a warning regarding the condition, and/or make a recommendation to resolve the condition. For example, in the illustrated example, the profiling system may recommend that a new partition be provisioned for tenant BOB.

As shown, the partition data view 630 includes a number of other tabs for other types of partition metadata. For example, access request frequency tab 633 may display information, statistics, or graphs associated with the number of access requests received by the partition, and/or the number of input and output operations performed the partition as a result of these access requests. For example, in some embodiments, the access request frequency may be determined and display over a period of time. In some embodiments, the frequencies may be displayed as a peak IOPS measure for the partition. The latency tab 634 may display information, statistics, or graphs associated with request latencies associated with requests directed to the partition. Longer latencies may indicate some sort of performance bottleneck associated with the resources used by the partition.

As shown, the partition data view may also include a value count tab 635. As discussed, in some embodiments, the metrics monitor may track the number and/or frequency of particular attributes, which may be used in the system's repartitioning decisions. For example, in some embodiments, the value count tab 635 may show the number of distinct user-specified partition keys (e.g., tenant IDs) in the partition, and also possibly the actual count of data items for each tenant ID in the partition. As discussed, in some embodiments, a partition having a large number of tenant IDs may be a candidate for repartitioning. In some embodiments, the repartitioning may be performed based on the data item count for each tenant ID, so as to approximately equalize the number of data items in each of the resulting partitions.

The rules tab 636 may display different rules, such as repartitioning rules or per-tenant restriction rules that are associated with the partition. In some embodiments, the GUI 600 may also indicate that certain rules that may be imminently triggered based on the current state of the partitions (e.g., a partition split is likely to occur within 24 hours). The log tab 637 may display historical information about the partition. For example, a log may be maintained regarding the various events that occurred on the partition over time, for example, the creation of the partition, any movements data to or from the partition, historical data growth, etc. Finally, the modify tab 638 may include control elements that allow an administrator or user to manually modify the partition, for example, to split the partition or merge the partition with another partition, among other operations. Those of ordinary skill in the art would understand that these tabs and functions are merely exemplary, and other embodiments, may display different types of information or include different controls to manage the tenant partitions.

Figure 7:
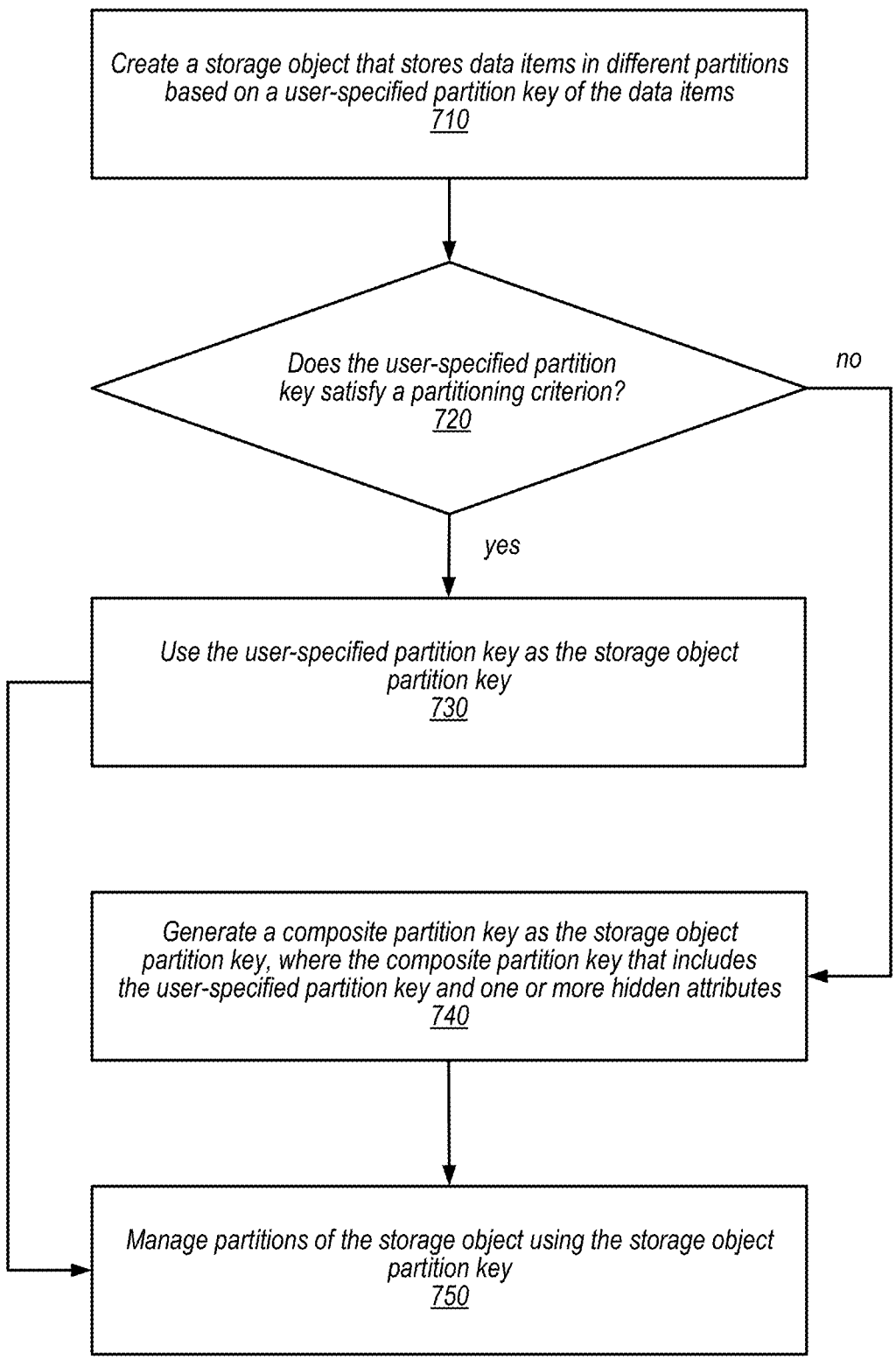
FIG. 7 is a flowchart illustrating a process of generating a composite partition key in a data store that manages tenant data usage across multiple partitions, according to some embodiments.

FIG. 7 is a flowchart illustrating a process of generating a composite partition key in a data store that manages tenant data usage across multiple partitions, according to some embodiments. In some embodiments, the operations in the figure may be performed by for example data store 130 and the partition manager 150, as discussed in connection with FIG. 1.

At operation 710, a storage object is created. The storage object stores data items in different partitions based on a user-specified partition of the data items. The storage object may be, for example, storage object 170 of FIG. 1. In some embodiments, each partition may be managed with a group of storage nodes, which may collectively manage the data for that partition. In some embodiments, the storage nodes may be virtual machine instances that are dynamically provisioned as new partitions are added.

At operation 720, a determination is made whether the user-specified partition key satisfies a partitioning criterion. In some embodiments, the determination may be made simply based on user input. For example, in some embodiments, the creation request for the storage object may indicate that the user-specified partition key is not adequate to be used as the actual partition key for storage object, and request that the data store generate a managed partition key for the storage object. In some embodiments, the data store or partition manager observe the storage object for a period of time with populated data, and then evaluate the user-specified partition key based on one or more performance criteria. For example, the partition manager may begin evaluating the user-specified partition key after the usage of the storage object reaches a certain level, observing the number of distinct key values associated with the user-specified partition key, observing the distribution of data across each partition key value, or observing the usage metrics (e.g., storage level, access or operation frequencies, request latency, etc.) associated with each partition key value. As shown, if these metrics satisfy the partitioning criterion, the data store may determine to use the user-specified partition key as the storage object partition key, in operation 730. However, if it is determined that the user-specified partition key fails to satisfy the partitioning criteria, the process proceeds to operation 740, where the data store creates a managed partition key for the storage object.

At operation 740, a composite partition key is generated as the storage object partition key. This composite partition key (e.g., composite partition key 178 of FIG. 1) may include the user-specified partition key and one or more hidden attributes. By including the user-specified partition key, the managed composite partition key may be used to subdivide the user-specified partitions, to allow the partition manager to achieve various types of partitioning or data distribution goals. In addition, the composite partition key preserves the boundaries of the original user-specified partitions, allowing the original user-specified partitions to be reconstructed. As discussed, the additional attributes to the composite partition key may be obtained in different ways. For example, the additional attributes may be a pseudorandom value or an existing attribute of the data items. In some embodiments, the additional attribute may be a hash value obtained from a set of existing attributes of the data items. In some embodiments, the set of attributes to be used for partitioning in this manner may be specified by a user via a configuration interface of the partition manager. In some embodiments, the hidden attributes may be hidden from clients of the data store, so that they are not generally visible to the clients.

At operation 750, the partitions of the storage object are managed using the selected storage object partition key, either the user-specified partition key or the generated composite partition key. In some embodiments, managing the partitions may entail generating new partition key values for new data items, monitoring various usage metrics for each of the partition key values, and if needed, performing repartitioning operations by splitting or merging partitions, or moving data from one partition to another. In some embodiments, these management operations may be performed by modifying the hidden attributes of the composite partition key.

Figure 8:
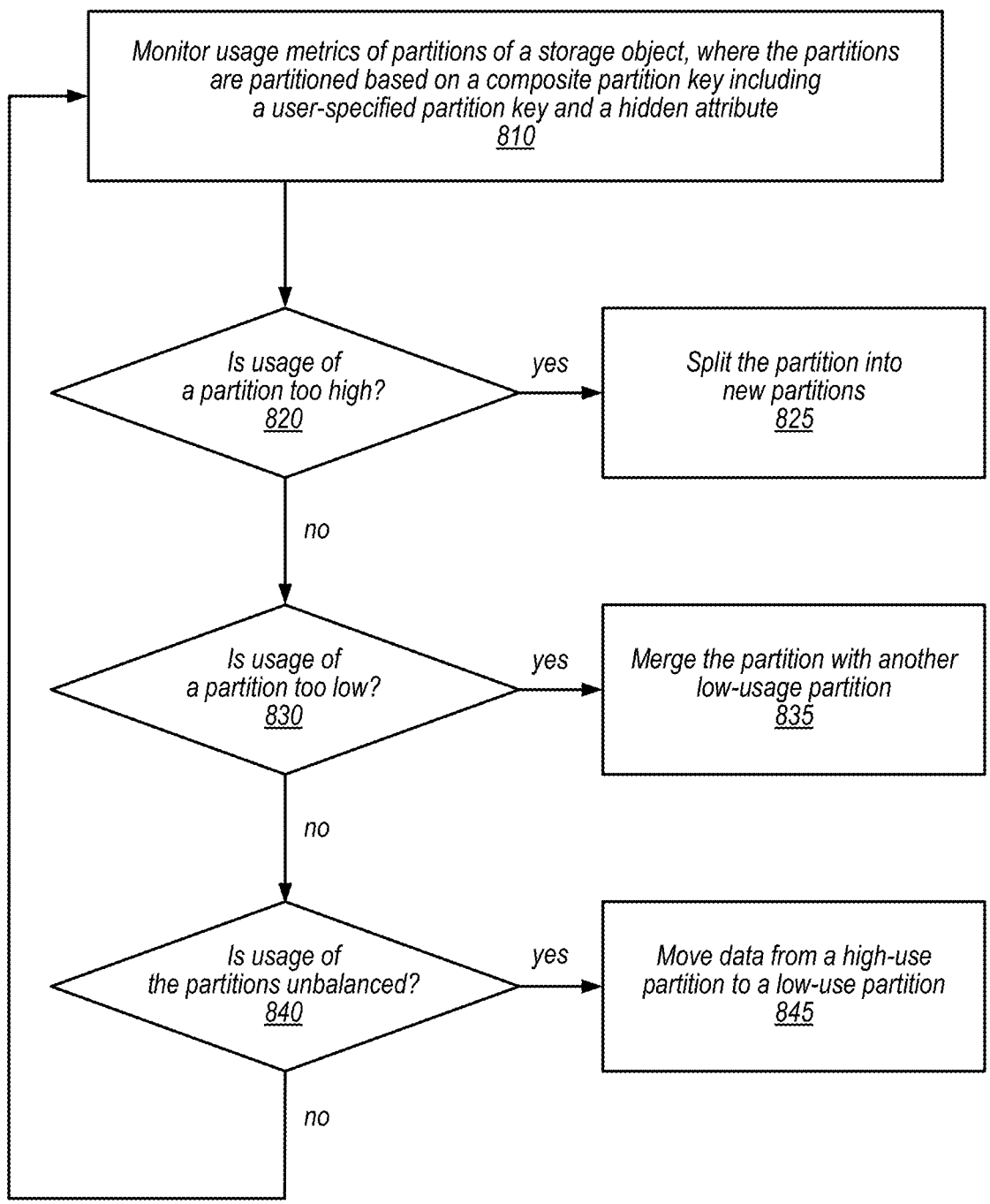
FIG. 8 is a flowchart illustrating a process of managing the data usage of tenants across multiple partitions, according to some embodiments.

FIG. 8 is a flowchart illustrating a process of managing the data usage of tenants across multiple partitions, according to some embodiments. The depicted operations of the flowchart may be performed, for example, by embodiments of the data store 130 or the partition manager 150, as discussed in connection with FIG. 1.

At operation 810, the usage metrics of partitions of a storage object are monitored. The storage object is partitioned based on a composite partition key (e.g., composite partition key 178 of FIG. 1) that includes a user-specified partition key and a hidden attribute. In some embodiments, the usage metrics may be tracked for different storage objects of the data store and different partitions of the data store. The usage metrics may include metrics such as the amount of data that is stored in each partition, the number of requests (of different types) that are directed to each partition, the number of distinct data values (or data items having each distinct value) for particular attributes in each partition, or performance metrics such as the number of exceptions received for data in each partition, or the latency associated with requests handled by each partition, among other things. These metrics may be used to make decisions about the dynamic management of the partitions. In some embodiments, the monitoring may be ongoing, so that the process is proceeds in a loop, as shown.

The flowchart depicts three example types of conditions that are monitored, and respective repartitioning actions that may be taken in response to these conditions. In some embodiments, these conditions and repartitioning actions may be specified in a partitioning policy, which may be configurable via a configuration interface. As would be appreciated by those skilled in the art, the conditions are repartitioning actions shown in the figure are merely exemplary, and other conditions are actions may be implemented in other embodiments of the partition manager.

At operation 820, the usage metrics is checked to determine if usage of a particular partition is too high. For example, the amount of storage used by a partition or the amount of requests directed to a partition may exceed a specified threshold. In this example, if the condition is detected, the process proceeds to operation 825. At operation 825, the partition is split in to multiple partitions. In some embodiments, the split operation may be performed by repartitioning the partition, reassigning the data items to different partitions. In some embodiments, the partition may be taken temporarily offline while the repartitioning operation is performed. In some embodiments, the repartitioning operation may only be performed when there are no active requests against the partition. In some embodiments, the split operation may also update the partition map (e.g., partition map 524) of the partition manager, or other metadata associated with partitions.

At operation 830, the usage metrics is checked to determine if usage of a particular partition is too low. For example, the amount of storage used by a partition or the amount of requests directed to a partition may fall below a specified minimum threshold. If the condition is detected, the process proceeds to operation 835. At operation 835, a merge operation may be performed to merge the partition into another partition of the same tenant. In some embodiments, multiple low-usage partitions may be identified before the merge operation is performed. In some embodiments, the merge operation may entail reassigning the data items in the to-be-merged partitions into the same partition. As with the split operation, in some embodiments, a partition map (e.g. partition map 524) or other partition metadata may be updated as a result of the merge.

At operation 840, the usage metrics is checked to determine if usage of partitions in the storage object is unbalanced. For example, a particular partition may be hosting much more data than its sister partitions. If the condition is detected, the process proceeds to operation 845. At operation 845, data may be moved from a high-usage partition to a low-usage partition. In some embodiments, the move may be accomplished by modifying the hidden attribute of the data items to be moved or changing the partition assignment function to allow the data items to be reassigned. The amount of moved data may be calculated so as to balance the usage metrics of the resulting partitions. In some embodiments, the move may be performed in an offline mode, in the background, or in stages. In some embodiments, the move may be performed in a manner so that it does not impact the access requests of the client.

Figure 9:
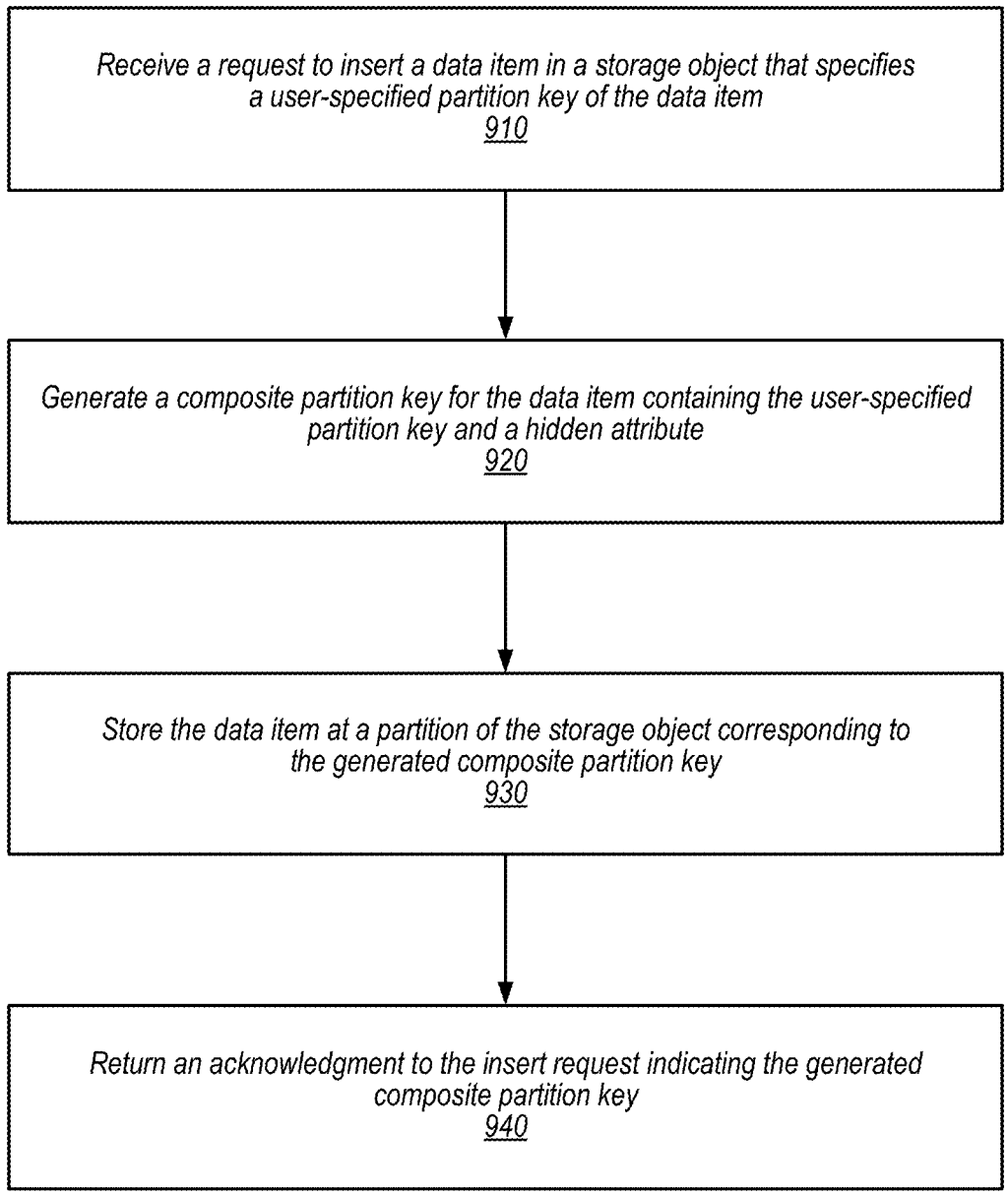
FIG. 9 is a flowchart illustrating a process of inserting data into a data store that manages tenant data usage across multiple partitions, according to some embodiments.

FIG. 9 is a flowchart illustrating a process of inserting data into a data store that manages tenant data usage across multiple partitions, according to some embodiments. The depicted operations of the flowchart may be performed, for example, by embodiments of the data store 130 or the partition manager 150, as discussed in connection with FIG. 1.

At operation 910, a request to insert a data item into a storage object is received. The request specifies a user-specified partition key of the data item. For example, the request indicates that the data is associated with a particular tenant ID.

At operation 920, a composite partition key for the data item is generated. The composite partition key (e.g., composite partition key 178 of FIG. 1) contains the user-specified partition key and a hidden attribute. In some embodiments, this operation may be performed via the normal data item insertion function of the database engine, which may automatically add a new partition key value to incoming data items. Thus, whenever new data items are inserted into the storage object, special steps are performed to assign the data item to a managed partition. These special steps may occur without any knowledge of the client that sent the insert request. As discussed, the assignment of the new data item may be performed in a variety of techniques. These may include for example, pseudorandom assignments, round robin assignments, or assignments using a hash of a set of attributes of the data items. In some embodiments, the assignment may be performed using a set of weights associated with the different partitions, so that some partitions may be assigned more incoming data items than others. In some embodiments, these weights may be adjusted dynamically according to configuration parameters, so as to control the relative growth of the partitions.

At operation 930, the data item is stored at a partition of the storage object corresponding to the generated composite partition key. In some embodiments, after the data item has been assigned to a partition, the data item is provided to the partition to be stored. In some embodiments, a partition is largely independent group of nodes, such as compute or storage nodes, that are responsible for a portion of the storage object's data that have been assigned to that partition. In some embodiments, the partition may be responsible for persisting the data item on persistent storage. In some embodiments, the partition may also replicate the data item in multiple storage locations, in order to satisfy a durability requirement.

At operation 940, an acknowledgment of the insert request is returned. The acknowledgment may indicate the generated composite partition key. In some embodiments, an insert request may be acknowledged with some metadata, for example, whether the request was completed successfully. In some embodiments, the metadata may optionally include the generated composite partition key. This way, the requesting client may be able to use the composite partition key to address the actual partition that the data item is assigned to. In some embodiments, it may be understood that the composite partition key may only be valid for a short period of time, for example, until the partition manager changes the key value as a result of repartitioning. In some embodiments, the partition manager may not change the actual key value, but only reassign the values to different partitions by changing the assignment function. In some embodiments, this allows the client to issue further requests to that new data item by directly addressing the actual partition that is storing the data. For example, the requesting client may issue a first insert request to create the data item in the data store, and then issue three follow up requests to update that data item. The three follow up requests may specify the partition key for the actual partition that is storing the data item.

Figure 10:
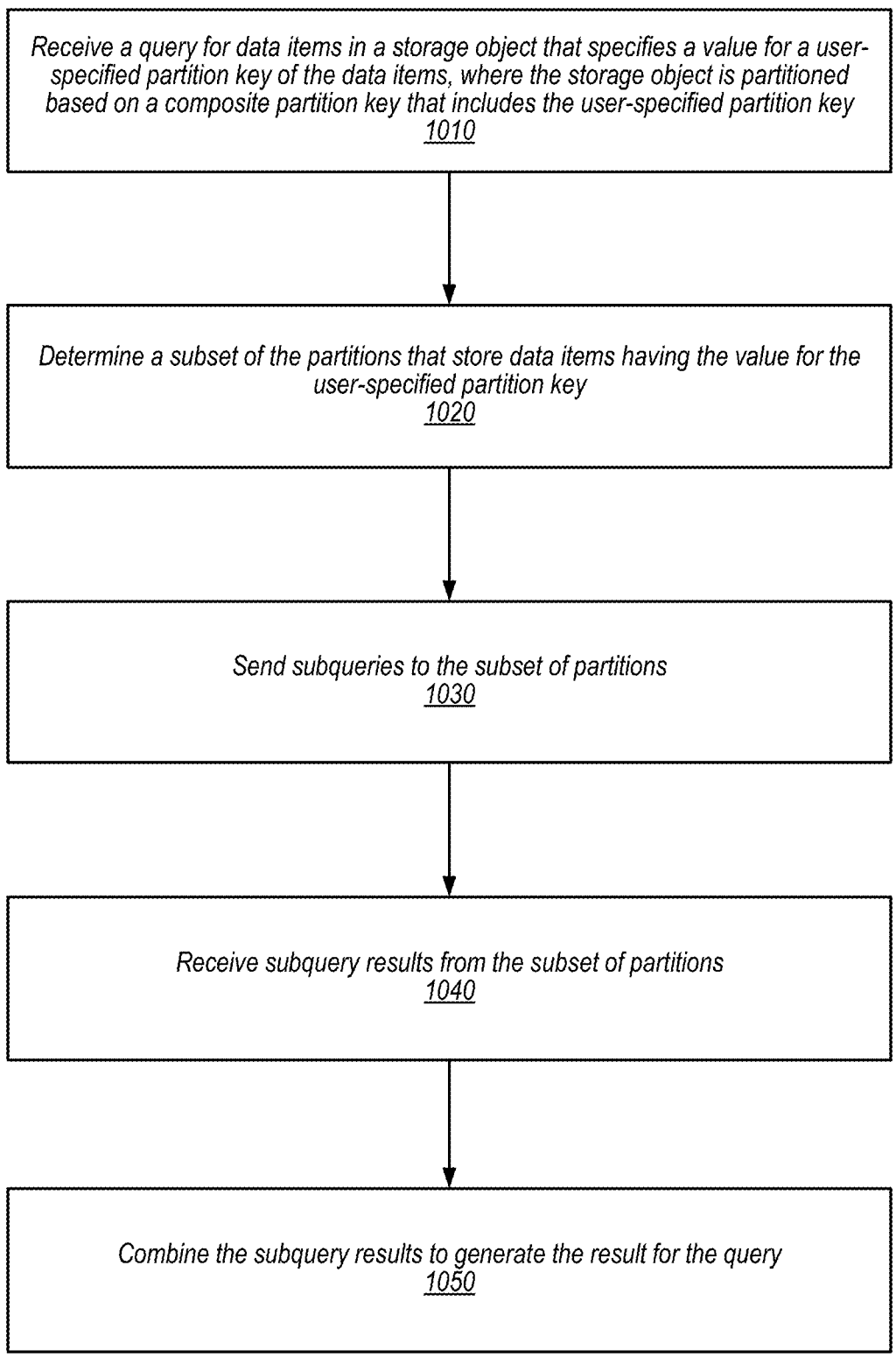
FIG. 10 is a flowchart illustrating a process of handling a query in a data store that manage tenant data usage across multiple partitions, according to some embodiments.

FIG. 10 is a flowchart illustrating a process of handling a query in a data store that manage client data usage across multiple partitions, according to some embodiments. The process may be performed via for example an embodiment of the query manager 510, as discussed in connection with FIG. 5.

At operation 1010, a query for data items is received at a data store. The query specifies a value for a user-specified partition key. For example, the query may be directed to data items of a particular tenant. The storage object is partitioned based on a composite partition key that includes the user-specified partition key. For example, the storage object may be storage object 170 as discussed in connection with FIG. 1. The query may be any type of query for data, which may be for example a query in Structured Query Language (SQL) or some other query language, or a function or service call for data, or a request issued as a result of a user command. In some cases, the query may include one or more filtering criteria to filter the returned data, or one or more sort criteria to sort the returned data.

At operation 1020, a subset of the partitions is determined that store data items having the specified value for the user-specified partition key. In some embodiments, operation 1020 may be performed via a lookup step, for example, using the partition map 524 as discussed in FIG. 5. The partition map may allow the query manager to determine which actual partitions are associated with the specified value for the user-specified partition key in the query. In some embodiments, the query manager may go a step further and narrow down the partitions to be queried. For example, in some embodiments, the partitions may store data items in ranges. For example, a first partition may store data items with sequence numbers 1-100, a second partition may store data items with sequence numbers 101-200, and so on. Based on this arrangement, a range query asking for data items within a particular range may be serviced by querying only partitions that contain data items falling within the range.

At operation 1030, multiple subqueries may be generated and sent to the subset of partitions. In some embodiments, each subquery may specify a different partition key associated with a different partition. In some embodiments, the generated subqueries may include the one or more filtering criteria in the original query. In some embodiments, the subqueries may be sent to the different partitions in parallel.

At operation 1040, respective subquery results are received from the partitions in the subset, in response to the subqueries. In some embodiments, the partitions may provide these subquery results in parallel to the query manager. In some embodiments, the provided subquery results may each be locally sorted. In some embodiments, the partitions may return results that are paginated, so that the query manager may interact with each partition to iteratively fetch additional pages of the results.

At operation 1050, the subquery results are combined to generate the result to the original query. In some embodiments, a merge sort may be performed to sort the subquery results into a globally sorted result set. In some embodiments, if the subquery results are already sorted locally, the merge sort may be performed quickly in one pass. In some embodiments, the combining operation may perform additional filtering, for example, to limit the result to the top 10 values from all of the subquery results. In some embodiments, the combining operation may perform additional aggregation functions, for example, to calculate an average of all subquery results. The combined results may then be sent back to the client that issued the original query. The query result may be returned in a variety of ways, for example, via the normal query interface of the data store, or via an API.

Figure 11:
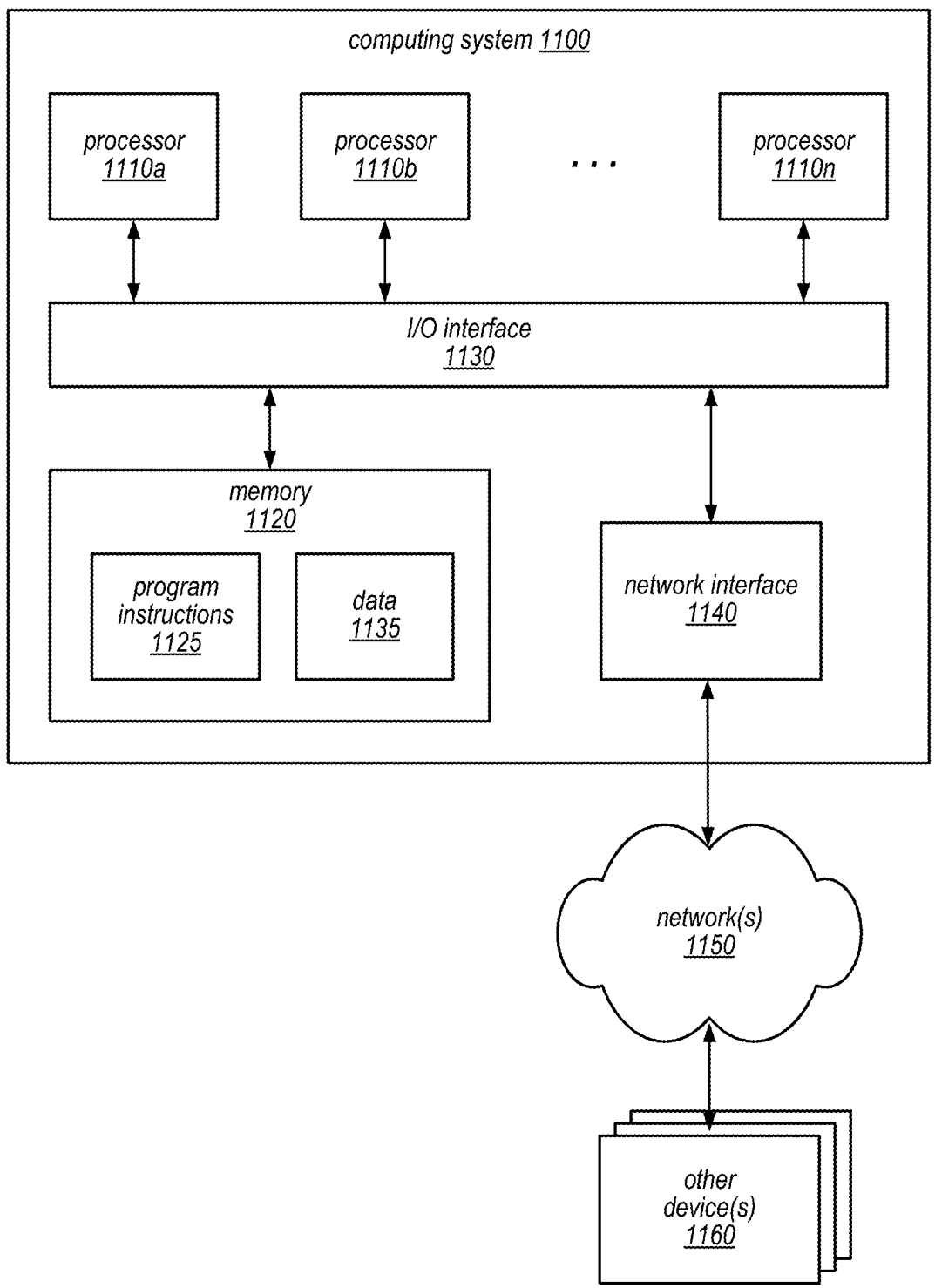
FIG. 11 is a block diagram illustrating an example computer system that can be used to implement one or more portions of a data store that manages tenant data usage across multiple partitions, according to some embodiments.

FIG. 11 is a block diagram illustrating an example computer system that can be used to implement one or more portions of a data store that manages tenant data usage across multiple partitions, according to some embodiments. Computer system 1100 may include or be configured to access one or more nonvolatile computer-accessible media. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1120 as code 1125 and data 1135.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 920, may be incorporated directly into processor 1110.

Network interface 1140 may be configured to allow data to be exchanged between computer system 1100 and other devices 1160 attached to a network or networks 1150, such as other computer systems or devices, such as routers and other computing devices, as illustrated in FIGS. 1 through 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above for FIGS. 1 through 10 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system, comprising:
a data store comprising one or more processors and associated memory, configured to:
create a storage object to store data items responsive to a creation request, the storage object comprising a plurality of partitions managed by respective storage nodes, wherein the creation request identifies a user-specified partition key of the data items to distribute data items for storage across the plurality of partitions;
determine that the user-specified partition key identified by the creation request has an insufficient number of distinct values to satisfy a partitioning criterion; and
responsive to the determination:
generate a composite partition key for the data items which satisfies the partitioning criterion, wherein the composite partition key includes the user-specified partition key and one or more other attributes; and override the user-specified partition key with the generated composite partition key such that the data store is configured to distribute data items for storage for the storage object across the plurality of partitions according to the composite partition key, wherein to distribute the data items according to the composite partition key the data store is configured to still preserve partition boundaries determined according to the user-specified partition key.

2. The system of claim 1, wherein to manage the partitioning of the storage object, the data store is configured to:
monitor one or more usage metrics of the partitions of the storage object;
detect, based at least in part on the monitoring, that usage of a particular partition exceeds a threshold; and
responsive to the detection, split the particular partition into two or more new partitions.

3. The system of claim 2, wherein to monitor the usage metrics, the data store is configured to monitor, for individual partitions, one or more of a space utilization level, an access frequency, a data value count, or a request latency.

4. The system of claim 1, wherein the user-specified partition key is a tenant identifier, and the data store is configured to:
receive via a configuration interface an isolation rule for a particular tenant identifier, specifying that data items associated with the particular tenant identifier can only be stored on partitions that do not store data items associated with other tenant identifiers; and
wherein to manage the partitioning, the data store complies with the isolation rule.

5. The system of claim 1, wherein the data store is configured to:
generate a user interface displaying usage metrics for distinct values of the user-specified partition key.

6. A method, comprising:
performing, via a data store comprising one or more processors and associated memory:
creating a storage object to store data items responsive to a creation request, wherein the storage object is partitioned into a plurality of partitions managed by respective storage nodes, and wherein the creation request identifies a user-specified partition key of the data items to distribute data items for storage across the plurality of partitions;
determining that the user-specified partition key fails to satisfy a partitioning criterion; and
responsive to the determination:
generating a composite partition key for the data items which satisfies the partitioning criterion, wherein the composite partition key includes the user-specified partition key and one or more other attributes; and
overriding the user-specified partition key with the generated composite partition key to distribute data items for storage across the plurality of partitions according to the composite partition key, wherein the distributing the data items according to the composite partition key preserves partition boundaries determined according to the user-specified partition key.

7. The method of claim 6, wherein said determining that the user-specified partition key fails to satisfy a partitioning criterion comprises receiving a configuration setting indicating that the storage object should be partitioned using the composite partition key.

8. The method of claim 6, wherein said determining that the user-specified partition key fails to satisfy a partitioning criterion comprises:
determining that one or more performance goals specified in the partitioning criterion are not satisfied by partitions partitioned according to the user-specified partition key.

9. The method of claim 6, wherein said managing the partitioning of the storage object comprises:
monitoring one or more usage metrics of the partitions of the storage object;
detecting, based at least in part on the monitoring, that usage of a particular partition exceeds a threshold; and
responsive to the detection, splitting the particular partition into two or more new partitions.

10. The method of claim 9, wherein said monitoring the usage metrics comprises monitoring, for individual partitions, one or more of a space utilization level, an access frequency, a data value count, or a request latency.

11. The method of claim 9, wherein said managing the partitioning of the storage object comprises:
detecting, based at least in part on the monitoring, that usage of a set of partitions fall below another threshold; and
responsive to the detection that usage of the set of partitions fall below the other threshold, merging the set of partitions.

12. The method of claim 6, wherein the user-specified partition key is a tenant identifier, and further comprising:
receiving, via a configuration interface of the data store, an isolation rule for a particular tenant identifier, specifying that data items associated with the particular tenant identifier can only be stored on partitions that do not store data items associated with other tenant identifiers; and
wherein managing the partitioning is performed in compliance with the isolation rule.

13. The method of claim 6, wherein the user-specified partition key is a tenant identifier, and further comprising:
receiving, via a configuration interface of the data store, a permission setting for a particular tenant identifier, specifying that data items associated with the particular tenant identifier may not be read by other tenants; and
enforcing the permission setting during servicing of read requests from other tenants for the storage object.

14. The method of claim 6, further comprising:
performing, via the data store:
receiving a query for data items having a particular value for the user-specified partition key;
determining a subset of the plurality of partitions that store data items having the particular value for the user-specified partition key based at least in part on a partition map; and
sending subqueries, generated based at least in part on the query, to the subset of the plurality of partitions.

15. The method of claim 6, further comprising:
generating a user interface displaying usage metrics for distinct values of the user-specified partition key.

16. A non-transitory computer-accessible storage medium storing program instructions that when executed on one or more processors of a data store, cause the data store to:
create a storage object to store data items responsive to a creation request, wherein the storage object is partitioned into a plurality of partitions managed by respective storage nodes, and wherein the creation request identifies a user-specified partition key of the data items to distribute data items for storage across the plurality of partitions;

determine that the user-specified partition key fails to satisfy a partitioning criterion; and responsive to the determination:

generate a composite partition key for the data items which satisfies the partitioning criterion, wherein the composite partition key includes the user-specified partition key and one or more other attributes; and override the user-specified partition key with the generated composite partition key to distribute data items for storage across the plurality of partitions according to the composite partition key, wherein the distributing the data items according to the composite partition key preserves partition boundaries determined according to the user-specified partition key.

17. The non-transitory computer-accessible storage medium of claim 16, wherein to manage the partitioning of the storage object, the program instructions when executed on the one or more processors cause the data store to:

monitor one or more usage metrics of the partitions of the storage object;

detect, based at least in part on the monitoring, that usage of a particular partition exceeds a threshold; and responsive to the detection, split the particular partition into two or more new partitions.

18. The non-transitory computer-accessible storage medium of claim 17, wherein to monitor the one or more usage metrics, the program instructions when executed on the one or more processors cause the data store to:

monitor, for individual partitions, one or more of a space utilization level, an access frequency, a data value count, or a request latency.

19. The non-transitory computer-accessible storage medium of claim 17, wherein to manage the partitioning of the storage object, the program instructions when executed on the one or more processors cause the data store to:

detect, based at least in part on the monitoring, that usage of a set of partitions fall below another threshold; and responsive to the detection that usage of the set of partitions fall below the other threshold, merge the set of partitions.

20. The non-transitory computer-accessible storage medium of claim 16, wherein the user-specified partition key is a tenant identifier, and to manage partitioning of the storage object, the program instructions when executed on the one or more processors cause the data store to:

comply with an isolation rule for a particular tenant identifier, such that data items associated with the particular tenant identifier are only stored on partitions that do not store data items associated with other tenant identifiers.

* * * * *